(12) United States Patent
Park (10) Patent No.: US 11,951,809 B2
(45) Date of Patent: Apr. 9, 2024

(54) AIR VENT FOR VEHICLE

(71) Applicant: ECOPLASTIC CORPORATION, Gyeongju-si (KR)

(72) Inventor: Hae Ju Park, Gyeongju-si (KR)

(73) Assignee: ECOPLASTIC CORPORATION, Gyeongju-si (KR)

( * ) Notice: Subject to any disclaimer, the term of this patent is extended or adjusted under 35 U.S.C. 154(b) by 36 days.

(21) Appl. No.: 17/852,913

(22) Filed: Jun. 29, 2022

(65) Prior Publication Data

US 2023/0001769 A1 Jan. 5, 2023

(30) Foreign Application Priority Data

Jul. 5, 2021 (KR) .......................... 10-2021-0087706

(51) Int. Cl.
*B60H 1/34* (2006.01)

(52) U.S. Cl.
CPC .................................. *B60H 1/3421* (2013.01)

(58) Field of Classification Search
USPC ......................................................... 454/155
See application file for complete search history.

(56) References Cited

U.S. PATENT DOCUMENTS

| | | | |
|---|---|---|---|
| 9,724,982 B2 * | 8/2017 | Jeon | B60H 1/3421 |
| 11,440,374 B2 * | 9/2022 | Egashira | B60H 1/00871 |
| 2005/0245189 A1 * | 11/2005 | Terai | B60H 1/3414 |
| | | | 454/155 |
| 2015/0004897 A1 * | 1/2015 | Ishikawa | B60H 1/3421 |
| | | | 454/155 |
| 2016/0001638 A1 * | 1/2016 | Rottmann | B60H 1/3421 |
| | | | 454/155 |

FOREIGN PATENT DOCUMENTS

| | | | | |
|---|---|---|---|---|
| KR | 20110037755 A | | 4/2011 | |
| KR | 20110071502 A | * | 6/2011 | ........... B60H 1/3421 |
| KR | 200473636 Y1 | | 7/2014 | |
| KR | 20160002036 A | | 1/2016 | |

OTHER PUBLICATIONS

Applicant: Ecoplastic Corporation; Indian Application No. 202244037352—filed Jun. 29, 2022; Indian Examination Report dated Jan. 11, 2023; 6 Pgs.

* cited by examiner

*Primary Examiner* — Avinash A Savani
*Assistant Examiner* — Dana K Tighe
(74) *Attorney, Agent, or Firm* — TAROLLI, SUNDHEIM, COVELL & TUMMINO L.L.P.

(57) ABSTRACT

Provided is an air vent for a vehicle, the air vent including a housing having formed therein a flow path in which air flows and a plurality of wing members rotatably engaged to the housing to open and close the flow path and having a gap formed to prevent the plurality of wing members to contact one another when the plurality of wing members rotate in a direction to close the flow path. With such a structure, when the wing member closes a flow path for discharging conditioned air to the interior of the vehicle, the flow path in which the air flows between the wing members through the gap may be changed, thereby minimizing inflow of the air.

6 Claims, 5 Drawing Sheets

AIR VENT FOR VEHICLE

CROSS REFERENCE TO RELATED APPLICATION

The present application claims priority to Korean Patent Application No. 10-2021-0087706, filed Jul. 5, 2021, the entire contents of which is incorporated herein for all purposes by this reference.

BACKGROUND OF THE INVENTION

Field of the Invention

The present invention relates to an air vent for a vehicle, and more particularly, to an air vent for a vehicle, which discharges conditioned air to the interior of the vehicle.

Description of the Related Art

Generally, a vehicle includes an air conditioner for cooling and heating the interior of the vehicle and an air vent device for controlling discharge volume and direction of air conditioned through the air conditioner.

Typically, the vehicle includes an instrument panel where a dashboard, an audio device, a glove box, etc., are mounted. The instrument panel is formed with a vent for blowing the air conditioned through the air conditioner into the interior, and the air vent device is installed in the vent to control discharge volume and direction of the conditioned air. Alternatively, the air vent device may be provided in a console for a rear passenger.

The air vent device may control discharge volume and direction of the conditioned air through rotation of a plurality of wings based on user manipulation, and block a discharge port with the plurality of wings when discharge of the air is not desired.

Figure 1:
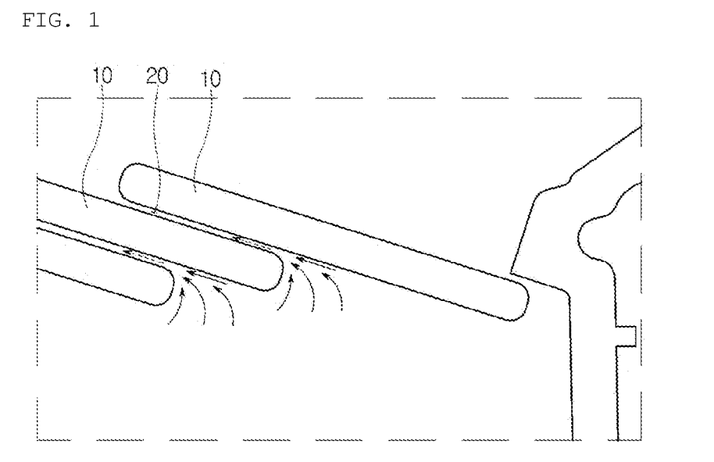
FIG. 1 is a view schematically showing a part of a conventional air vent for a vehicle.

FIG. 1 is a partial plane view schematically showing a conventional air vent device.

Referring to FIG. 1, the conventional air vent device includes a plurality of wing members 10 that rotate by user's manipulation to control discharge volume and direction of conditioned air. As shown in FIG. 1, when the plurality of wing members 10 overlap one another by rotating in one direction, they enter a closed state where discharge of the air may be blocked.

However, the conventional air vent device has a problem in which the air leaks into the interior of the vehicle through a gap 20 between the wing members 10 in the closed state of the plurality of wing members 10, and in this case, whistle noise is generated.

Moreover, when the plurality of wing members 10 are closed, they make noise by colliding with one another.

SUMMARY OF THE INVENTION

The present invention is provided to solve the foregoing problems, and aims to provide an air vent for a vehicle, which is capable of minimizing inflow of air between wing members when the wing members close a flow path for discharging conditioned air into the interior of the vehicle.

The present invention also aims to provide an air vent for a vehicle, which is capable of preventing generation of whistle noise by reducing a flow rate even in case of inflow of the air between wing members when the wing members close a flow path for discharging conditioned air into the interior of the vehicle.

In addition, the present invention aims to provide an air vent for a vehicle, which is capable of preventing noise from being generated by collision between wing members when the wing members rotate in a direction to close a flow path for discharging conditioned air into the interior of the vehicle.

An air vent for a vehicle includes a housing having formed therein a flow path in which air flows and a plurality of wing members rotatably engaged to the housing to open and close the flow path and having a gap formed to prevent the plurality of wing members to contact one another when the plurality of wing members rotate in a direction to close the flow path.

Herein, the gap may change a flow path through which air flows to minimize inflow of the air, and may form a pressure reducing section to reduce a flow rate.

More specifically, the gap may include an inflow path formed in a direction perpendicular to a flow direction of the air flowing in the flow path, a curved flow path connected to the inflow path and formed curvedly to protrude in the flow direction of the air flowing in the flow path, and a discharge flow path connected to the curved flow path and through which the flowing-in air is discharged.

Herein, the inflow path and the discharge flow path may be formed in a direction parallel to a plurality of wing members.

The discharge flow path may be formed upper than the inflow path with respect to the flow direction of the air.

The inflow path, the curved flow path, and the discharge flow path may be formed to have the same cross-sectional area in the flow direction of the air.

Alternatively, the curved flow path may be formed to have a smaller cross-sectional area in the flow direction of the air than at least any one of the inflow path and the discharge flow path.

Moreover, the discharge flow path may be formed to have a larger cross-sectional area than the inflow path in the flow direction of the air.

The wing member may include a protrusion portion formed to protrude outwardly from a surface, a first flange portion formed to extend outwardly from the protrusion portion, a groove portion formed insertedly in the other surface and accommodating a protrusion portion of an adjacent wing member to form the gap, and a second flange portion continuing from the groove portion on the other surface and formed protruding to face a first flange portion of the adjacent wing member.

In this case, the gap may include an inflow path formed by the first flange portion of the wing member and a second flange portion of the adjacent wing member, a curved flow path formed by the protrusion portion of the wing member and a groove portion of the adjacent wing member, and a discharge flow path connected to the curved flow path and formed by the wing member and the adjacent wing member to allow the flowing-in air to be discharged therethrough.

Herein, an outer circumferential surface of the first flange portion and an outer circumferential surface of the second flange portion may be formed curvedly to extend to each other in a streamlined shape and guide the air in a direction inclined with respect to the flow direction of the air flowing in the flow path.

With this structure, the air flowing along the outer circumferential surface of the first flange portion and the outer circumferential surface of the second flange portion may form eddies with air having collided with the wing member where the second flange portion is formed to minimize inflow of the air between the first flange portion and the second flange portion.

The wing member may include a support portion formed protruding from the first flange portion and contacting the second flange portion of the adjacent wing member to maintain the gap.

Herein, a plurality of support portions may be disposed separated in a width direction of the first flange portion and make a point-contact with an adjacent wing member.

Alternatively, the support portion may be formed continuously in the width direction of the first flange portion and make a line-contact with the adjacent wing member.

The air vent for a vehicle according to an embodiment of the present invention may further include a sealing portion manufactured of an elastic material and provided in a side end portion of the wing member to contact the adjacent wing member.

The sealing portion may include an engagement portion engaged to the wing member, a protrusion portion formed protruding to be accommodated in a groove portion formed insertedly in the other surface of the adjacent wing member and thus to form the gap, and a first flange portion formed to extend outwardly from the protrusion portion and make a surface-contact with the second flange portion formed to protrude continuing from the groove portion on the other surface of the adjacent wing member.

The outer circumferential surface of the first flange portion and the outer circumferential surface of the second flange portion may be formed curvedly to continue with each other in a streamlined shape and guide the air in a direction inclined with respect to the flow direction of the air flowing in the flow path.

DETAILED DESCRIPTION OF THE INVENTION

Hereinafter, embodiments of the present disclosure will be described with reference to the accompanying drawings.

Various changes may be made to the present disclosure and the present disclosure may have various embodiments which will be described in detail with reference to the drawings. Such a description is not intended to limit the present disclosure to specified embodiments, and is construed as including all changes, equivalents, or substitutes included in the spirit and technical scope of the present disclosure.

The terms used in the present application are for the purpose of describing particular exemplary embodiments only and are not intended to be limiting. It is to be understood that the singular forms include plural references unless the context clearly dictates otherwise.

All of the terms used herein including technical or scientific terms have the same meanings as those generally understood by an ordinary skilled person in the related art unless they are defined otherwise. The terms defined in a generally used dictionary may be interpreted as having meanings that are the same as or similar with the contextual meanings of the relevant technology and may not be interpreted as having ideal or exaggerated meanings unless they are clearly defined in the present application.

Hereinafter, detailed embodiments of the present disclosure will be described with reference to the accompanying drawings.

Figure 2:
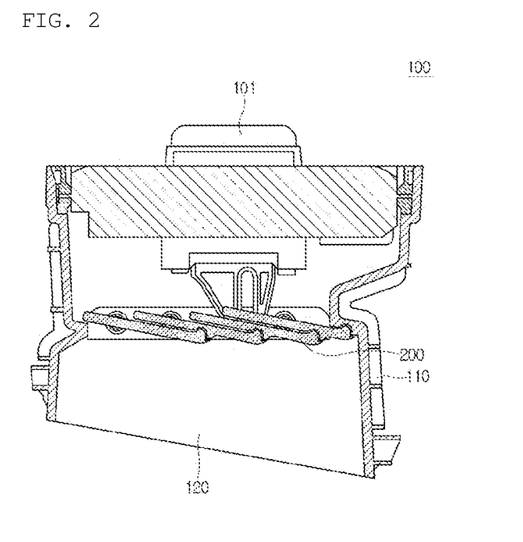
FIG. 2 is a plane view schematically showing an air vent for a vehicle, according to an embodiment of the present invention.
Figure 3:
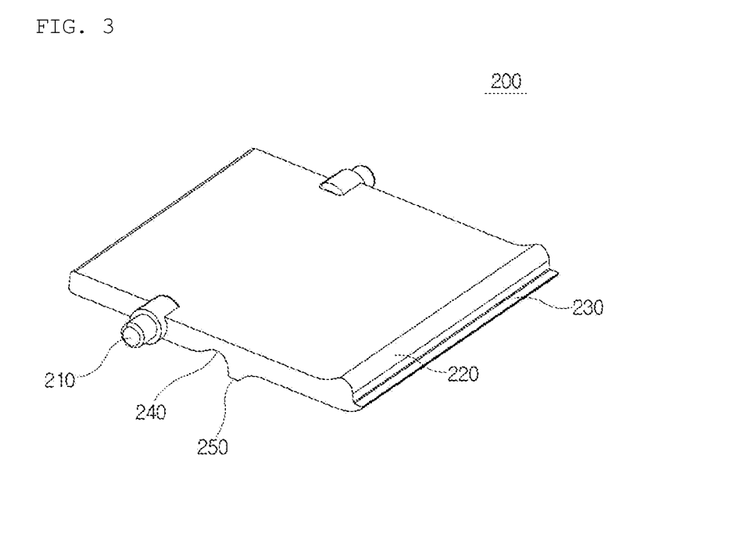
FIG. 3 is a perspective view schematically showing a wing member extracted from an air vent for a vehicle, according to an embodiment of the present invention.
Figure 4:
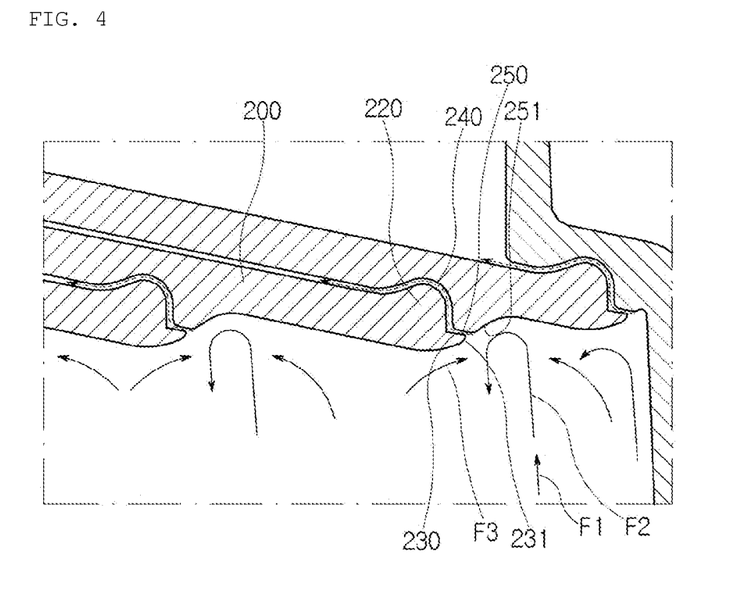
FIG. 4 is a view schematically showing a state where a flow path is closed by an air vent for a vehicle, according to an embodiment of the present invention.
Figure 5:
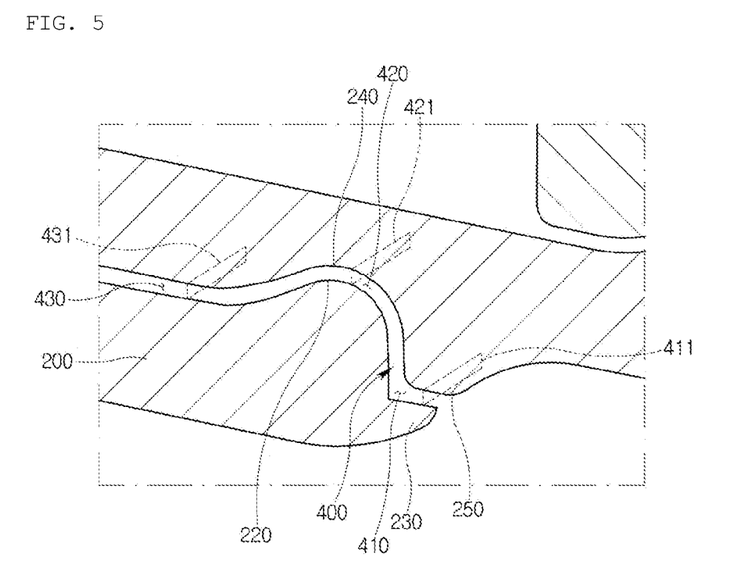
FIG. 5 is a view schematically showing a gap formed by a wing member of an air vent for a vehicle, according to an embodiment of the present invention.
Figure 6:
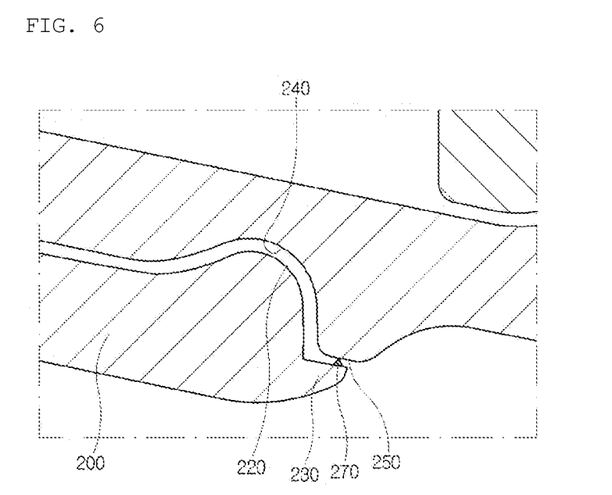
FIG. 6 is a view schematically showing a state where a wing member of an air vent for a vehicle further includes a support portion, according to an embodiment of the present invention.
Figure 7:
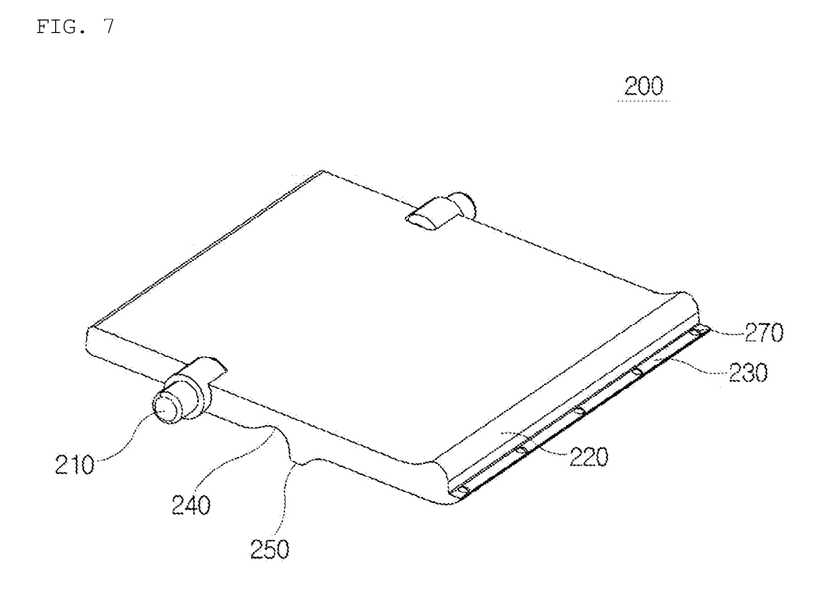
FIGS. 7 and 8 are perspective views schematically showing a state where a wing member of an air vent for a vehicle further includes a support portion, according to an embodiment of the present invention.
Figure 8:
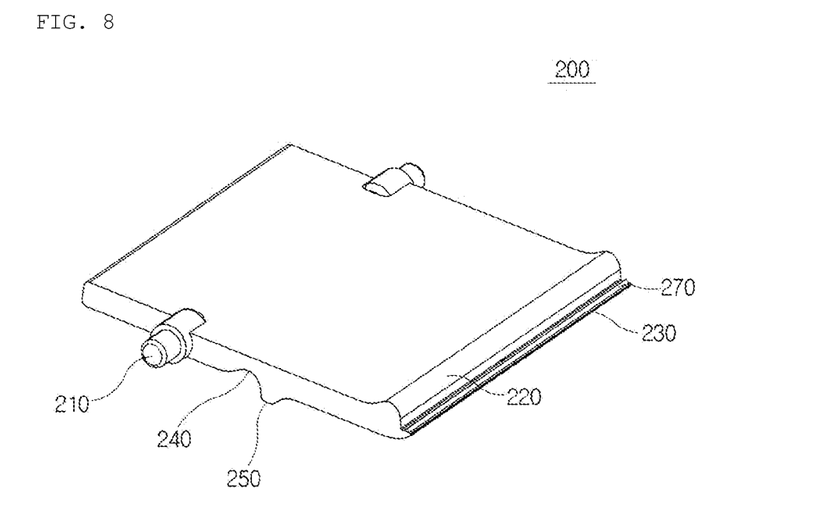
Figure 9:
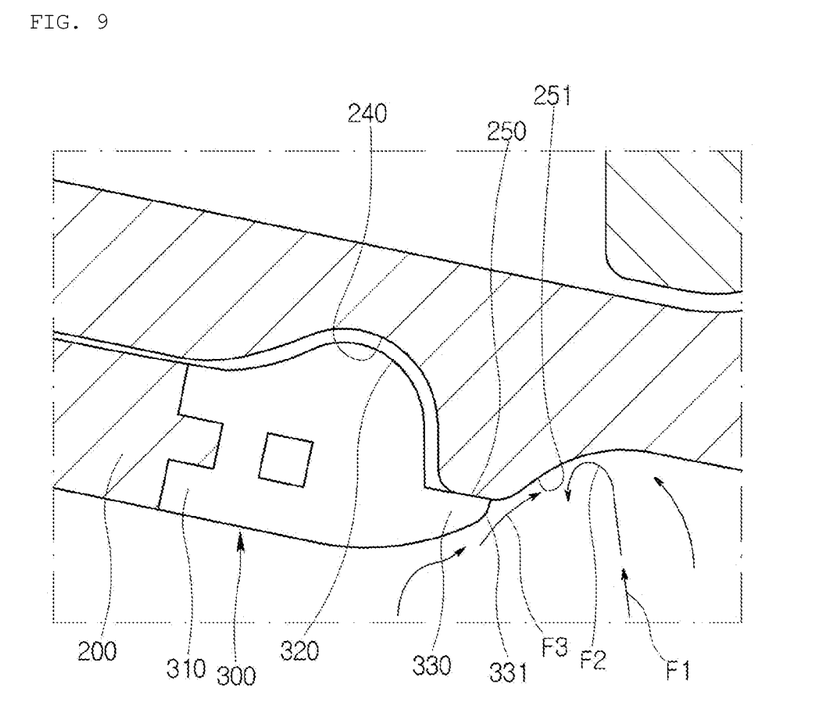
FIG. 9 is a view schematically showing a state where an air vent for a vehicle further includes a sealing portion, according to an embodiment of the present invention.

FIG. 2 is a plane view schematically showing an air vent for a vehicle, according to an embodiment of the present invention, and FIG. 3 is a perspective view schematically showing a wing member extracted from the air vent for the vehicle. FIG. 4 is a view schematically showing a state where a flow path is closed by the air vent for the vehicle, and FIG. 5 is a view schematically showing a gap formed by a wing member of the air vent for the vehicle. FIGS. 6 through 8 are views schematically showing a state where a the wing member of the air vent for the vehicle further includes a support portion, and FIG. 9 is a view schematically showing the air vent for the vehicle further includes a sealing portion.

Referring to FIGS. 2 to 9, an air vent 100 for a vehicle according to an embodiment of the present invention may include a housing 110 having formed therein a flow path 120 through which air flows, and a plurality of wing members 200 rotatably engaged to the housing 10 to open and close the flow path 120.

Herein, the wing member 200 may be connected to a knob 101 such that when the user moves the knob 101, the wing member 200 rotates correspondingly. The plurality of wing members 200 may be connected to one another by a link (not shown), etc., to rotate together.

However, a structure for rotation of the wing member 200 is not limited thereto and any method such as a dial type, a vibration type, etc., may be applied as long as the wing member 200 may rotate.

The housing 110 may be connected to an air conditioning device (not shown) provided in the vehicle, and hot or cold air generated by the air conditioning device may be supplied to the interior of the vehicle through the flow path 120.

The wing member 200 may be provided in plural and rotatably engaged to the housing 110 to open and close the flow path 120, and a gap 400 may be formed to prevent the wing members 200 from contacting one another when the wing members 200 rotate in a direction to close the flow path 120.

Herein, the gap 400 may change a flow path through which air flows to minimize inflow of the air, and may form a pressure reducing section to reduce a flow rate.

That is, the plurality of wing members 200 may be disposed to have the gap 400 without contacting one another even when they rotate in a direction to close the flow path 120, thereby preventing the wing members 200 from colliding with one another.

Moreover, the air may flow in through the gap 400, but the path in which the air flows through the gap 400 may be changed to minimize inflow of the air, and the pressure reducing section in the gap 400 may be formed to reduce the flow rate of the flowing air, thus preventing generation of whistle noise.

To this end, the wing member 200 may include a rotation shaft 210 rotatably engaged to the housing 110, a protrusion portion 220 formed to protrude outwardly from a surface, a first flange portion 230 formed extending outwardly from the protrusion portion 220, a groove portion 240 insertedly formed on the other surface and accommodating the protrusion portion 220 of an adjacent wing member to form the gap 400, and a second flange portion 250 continuing from the groove portion 240 on the other surface and formed to protrude facing the first flange portion 230 of the adjacent wing member.

With such a structure, the gap 400 may include an inflow path 410 formed by the first flange portion 230 of the wing member 200 and the second flange portion 250 of the adjacent wing member, a curved flow path 420 formed by the protrusion portion 220 of the wing member 200 and the groove portion 240 of the adjacent wing member, and a discharge flow path 430 connected to the curved flow path 420 and formed by the wing member 200 and the adjacent wing member so as to discharge the flowing-in air therethrough.

The inflow path 410 may be formed by a space in which the first flange portion 230 and the second flange portion 250 are separated from each other facing each other.

The inflow path 410 may be formed, for example, in a direction perpendicular to a flow direction F1 of air flowing through the flow path 120.

Once the inflow path 410 is formed as such, the inflow to the inflow path 410 may not be easy to achieve, thus minimizing the inflow of the air to the inflow path 410.

The curved flow path 420 may be formed by a space in which the protrusion portion 220 and the groove portion 240 are separated from each other facing each other.

The curved flow path 420 may be connected to the inflow path 410, and may be formed curvedly to protrude in the flow direction F1 of the air flowing through the flow path 120. That is, the curved flow path 420 may be formed curvedly in a semicircular form after being bent in a direction perpendicular to the inflow path 410.

Once the curved flow path 420 is formed as such, it may serve as a bather with respect to a flow direction of the inflow path 410, thereby minimizing the inflow of the air to the inflow path 410.

As the pressure reduction section is formed in a portion of the curved flow path 420, which is curved in the semicircular form, the flow rate of the air flowing through the curved flow path 420 may be minimized. Herein, the pressure reducing section may be a section continuing from a peak of the protrusion portion 220 to the discharge flow path 430. In this way, the flow rate of the air is reduced, thus preventing generation of whistle noise.

The discharge flow path 430 may be formed by a space where the wing member 200 and the adjacent wing member thereto are separated from each other facing each other to allow the air passing through the curved flow path 420 to be discharged toward the interior of the vehicle therethrough.

Herein, the discharge flow path 430 may be formed upper than the inflow path 120 with respect to the flow direction of the air. In this way, the flow rate of the air may be prevented from increasing.

The inflow path 410 and the discharge flow path 430 may be formed in parallel to the plurality of wing members 200, as shown in the drawings.

However, without being limited thereto, at least any one of the inflow path 410 and the discharge flow path 430 may be disposed to be inclined with respect to the disposition direction of the wing member 200.

Referring to FIG. 5, an inflow cross-sectional area 411 in the flow direction of the air of the inflow path 410, a curved flow cross-sectional area 421 in the flow direction of the air of the curved flow path 420, and a discharge flow cross-sectional area 431 in the flow direction of the air of the discharge flow path 430 may be the same as one another.

For example, the curved flow cross-sectional area 421 may be smaller than the inflow cross-sectional area 411 and the discharge flow cross-sectional area 431.

That is, when the curved flow cross-sectional area 421 is smaller than the inflow cross-sectional area 411, a flow volume flowing in the curved flow cross-sectional area 421 may be reduced, and when the discharge flow cross-sectional area 431 is greater than the curved flow cross-sectional area 421, the pressure may be reduced, thus reducing a flow rate.

When the discharge flow cross-sectional area 431 is formed greater than the inflow cross-sectional area 411, the pressure may be further degraded in the discharge flow path 430, further reducing a flow rate.

An outer circumferential surface 231 of the first flange portion 230 and an outer circumferential surface 251 of the second flange portion 250 may be formed curvedly to extend to each other in a streamlined shape, and may guide the air to flow in a direction inclined with respect to the flow direction F1 of the air flowing through the flow path 120.

In such a shape, as shown in FIG. 4, air F3 flowing along the outer circumferential surface 231 of the first flange portion 230 and the outer circumferential surface 251 of the second flange portion 250 may form eddies in combination with air F2 colliding with the wing member 200 where the second flange portion 250 is formed.

That is, the eddies may be formed in front of the inflow path 410 to minimize the inflow of the air to the inflow path 410 between the first flange portion 230 and the second flange portion 250.

The wing member 200 may further include a support portion 270 that is formed protruding from the first flange portion 230 and thus contacts the second flange portion 250 of the adjacent wing member to maintain the gap 400, as shown in FIG. 6.

Herein, the support portion 270 may be manufactured of an elastic material to elastically contact the second flange portion 250, thus preventing contact noise, and to reduce a collision force with the second flange portion 250, thus preventing a collision damage.

For example, a plurality of support portions 270 may be formed and arranged separated in a width direction of the first flange portion 230 and structured to make a point-contact with the adjacent wing member, as shown in FIG. 7.

In another example, as shown in FIG. 8, the support portion 270 may be formed continuously in the width direction of the first flange portion 230 and structured to make a line-contact with the adjacent wing member. As such, when the support portion 270 makes a line-contact with the second flange portion 250 of the adjacent wing member, inflow of the air through the gap 400 may be preferentially blocked.

Moreover, the air vent 100 for a vehicle according to an embodiment of the present invention may further include a sealing portion 300 that is formed of an elastic material and is provided in a side end portion of the wing member 200 to contact the adjacent wing member.

That is, when the sealing portion 300 is provided, it makes a surface-contact with the second flange portion 250 of the adjacent wing member, thus preferentially blocking the inflow of the air through the gap 400, as shown in FIG. 9.

To this end, the sealing portion 300 may include an engagement portion 310 engaged to the wing member 200, a protrusion portion 320 formed protruding to be accommodated in the groove portion 240 formed insertedly in the other surface of the adjacent wing member and forming the gap 400, and a first flange portion 330 formed extending outwardly from the protrusion portion 320 and making a surface-contact with the second flange portion 250 formed to protrude continuing from the groove portion 240 on the other surface of the adjacent wing member.

Such a sealing portion 300 may be formed integrally through insert-injection in the wing member 200 or may be further engaged to the wing member 200 after separately manufactured through injection molding.

An outer circumferential surface 331 of the first flange portion 330 of the sealing portion 300 and the outer circumferential surface 251 of the second flange portion 250 may be formed curvedly to continue to each other in the streamlined shape, and may guide the air to flow in a direction inclined with respect to the flow direction F1 of the air flowing through the flow path 120.

In such a shape, as shown in FIG. 9, the air F3 flowing along the outer circumferential surface 331 of the first flange portion 330 of the sealing portion 300 and the outer circumferential surface 251 of the second flange portion 250 may form eddies in combination with air F2 colliding with the wing member 200 where the second flange portion 250 is formed.

That is, in spite of occurrence of a situation where the air is likely to flow in through the gap 400 due to a contact failure between the first flange portion 330 of the sealing portion 300 and the second flange portion 250, air leakage, etc., eddies may be formed in front of the first flange portion 330 and the second flange portion 250, thus minimizing inflow of the air between the first flange portion 330 and the second flange portion 250.

With the air vent for a vehicle according to the present invention, when the wing member closes a flow path for discharging conditioned air to the interior of the vehicle, the flow path in which the air flows between the wing members may be changed, thereby minimizing inflow of the air.

According to the present invention, when the wing member closes the flow path for discharging the conditioned air to the interior of the vehicle, the pressure reducing section may be formed to reduce the flow rate in spite of the inflow of the air between the wing members, thereby preventing whistle noise.

Moreover, according to the present invention, when the wing members rotate in a direction to close the flow path for discharging conditioned air into the interior of the vehicle, it is possible to prevent noise from being generated by collision between the wing members.

Although the present disclosure has been described in detail through specific embodiments, it is intended to describe the present disclosure in detail, and the present disclosure is not limited thereto, and it is apparent that the present disclosure may be modified or improved by those of ordinary skill in the art within the technical spirit of the present disclosure.

All simple modifications and variations of the present disclosure fall within the scope of the present disclosure, and the specific protection range of the present disclosure will be made clear by the appended claims.

DESCRIPTION OF REFERENCE NUMERALS

100: AIR VENT FOR VEHICLE
110: HOUSING
120: FLOW PATH
200: WING MEMBER
210: ROTATION SHAFT
220: PROTRUSION PORTION
230: FIRST FLANGE PORTION
240: GROOVE PORTION
250: SECOND FLANGE PORTION
270: SUPPORT PORTION
300: SEALING PORTION
310: ENGAGEMENT PORTION
320: PROTRUSION PORTION
330: FIRST FLANGE PORTION
400: GAP
410: INFLOW PATH
411: INFLOW CROSS-SECTIONAL AREA
420: CURVED FLOW PATH
421: CURVED FLOW CROSS-SECTIONAL AREA
430: DISCHARGE FLOW PATH
431: DISCHARGE FLOW CROSS-SECTIONAL AREA

What is claimed is:

1. An air vent for a vehicle, the air vent comprising:
a housing having formed therein a flow path in which air flows; and
a plurality of wing members rotatably engaged to the housing to open and close the flow path and having a gap formed between adjacent wing members of the plurality of wing members when the plurality of wing members rotate in a direction to close the flow path,
wherein the gap changes a path in which the air flows to minimize inflow of the air, and forms a pressure reducing section to reduce a flow rate,
wherein each wing member of the plurality of wing members comprises:
a protrusion portion formed to protrude outwardly from a surface;
a first flange portion formed to extend outwardly from the protrusion portion;
a groove portion formed insertedly in an opposite surface and accommodating a protrusion portion of an adjacent wing member of the plurality of wing members to form the gap; and
a second flange portion continuing from the groove portion on the opposite surface and formed protruding to face a first flange portion of the adjacent wing member of the plurality of wing members,
wherein the gap comprises:
an inflow path formed by the first flange portion of each wing member of the plurality of wing members and a second flange portion of the adjacent wing member of the plurality of wing members;
a curved flow path formed by the protrusion portion of each wing member of the plurality of wing members and a groove portion of the adjacent wing member of the plurality of wing members; and a discharge flow path connected to the curved flow path and formed by each wing member of the plurality of wing members and the adjacent wing member of the plurality of wing members to allow air to be discharged therethrough, wherein an outer circumferential surface of the first flange portion and an outer circumferential surface of the second flange portion are formed curvedly to extend to each other in a streamlined shape and guide the air in a direction inclined with respect to the flow direction of the air flowing in the flow path.

2. The air vent of claim 1, wherein the gap comprises:

an inflow path formed in a direction perpendicular to a flow direction of the air flowing in the flow path;

a curved flow path connected to the inflow path and formed curvedly to protrude in the flow direction of the air flowing in the flow path; and a discharge flow path connected to the curved flow path and through which air is discharged.

3. The air vent of claim 2, wherein the discharge flow path is formed above the inflow path with respect to the flow direction of the air.

4. The air vent of claim 2, wherein the curved flow path is formed to have a smaller cross-sectional area in the flow direction of the air than at least any one of the inflow path and the discharge flow path.

5. The air vent of claim 1, wherein the air flowing along the outer circumferential surface of the first flange portion and the outer circumferential surface of the second flange portion form eddies with air having collided with each wing member of the plurality of wing members where the second flange portion is formed to minimize inflow of the air between the first flange portion and the second flange portion.

6. The air vent of claim 1, wherein each wing member of the plurality of wing members comprises a support portion formed protruding from the first flange portion and contacting the second flange portion of the adjacent wing member of the plurality of wing members to maintain the gap between the adjacent wing members of the plurality of wing members.

* * * * *